United States Patent [19]

Sato

[11] Patent Number: 5,034,674
[45] Date of Patent: Jul. 23, 1991

[54] MOTOR DRIVING VOLTAGE CONTROL DEVICE

[75] Inventor: Shoji Sato, Kanagawa, Japan

[73] Assignee: Canon Kabushiki Kaisha, Tokyo, Japan

[21] Appl. No.: 523,548

[22] Filed: May 15, 1990

[30] Foreign Application Priority Data

May 17, 1989 [JP] Japan .................................. 1-121451

[51] Int. Cl.$^5$ ............................................. H02P 8/00
[52] U.S. Cl. ..................................... 318/696; 318/685
[58] Field of Search ................................ 318/696, 685

[56] References Cited

U.S. PATENT DOCUMENTS 4,661,755  4/1987  Suzuki ................................ 318/696

Primary Examiner—William M. Shoop, Jr,
Assistant Examiner—Saul M. Bergmann
Attorney, Agent, or Firm—Fitzpatrick, Cella, Harper & Scinto

[57] ABSTRACT

A voltage control device for controlling a driving voltage applied to a motor having a plurality of phases is provided with a switching circuit for changing thr motor driving voltage from one voltage value over to another among a plurality of voltage values. The switching circuit is arranged to have a stop phase of the motor excited by a lower driving voltage than a rotation driving voltage in adjusting the stop phase at which the motor has been stopped.

7 Claims, 8 Drawing Sheets

MOTOR DRIVING VOLTAGE CONTROL DEVICE

BACKGROUND OF THE INVENTION

1. Field of the Invention

This invention relates to a voltage control device for controlling a voltage used for driving, for example, a motor operated with a high internal impedance battery employed as a power source.

2. Description of the Related Art

Generally, the devices of the above-stated kind have been arranged to operate in one of two different modes, one mode when the motor is rotated and in another mode when the motor is in repose. Some of them are arranged to have the motor driven at a high voltage when the motor is rotating and to have a weak current continuously applied at such a low voltage that never causes any phase deviation of the motor when the motor is in repose.

In cases where a battery is used as a power source, the method of continuously applying a weak current when the motor is in repose has not been adopted for the purpose of saving the electrical energy of the battery from being wasted. In this case, the above-stated method is replaced with a method, wherein, before rotating the motor, a phase at which the motor is brought to a stop at the end of a previous operation is excited for a given period of time T0, as shown in FIG. 8 of the accompanying drawings, in such a way as to adjust the phase of control to the actual phase of the motor. This method prevents the motor from going out of control due to any slight phase deviation that occurs when the motor is previously brought to a stop. An example of this method has been disclosed, as a stepping motor control method, for example, in Japanese Lid-Open Patent Application NO. SHO 59-201885. Further, in a case where the motor is to be driven at a low voltage by means of a battery, the battery consumption can be lessened by preventing the current from being wasted in the following manner. In some cases, not much current is required in obtaining a required amount of torque, while a relatively greater amount of current is required in other cases. Therefore, the battery consumption can be lessened by varying the required amount of driving voltage stepwise, to several values. In FIG. 8, a reference symbol $\Delta VB3$ denotes a fluctuating range of the power supply voltage. In such a case, as shown in FIG. 8, a stop-phase exciting action for phase adjustment is carried out after the driving voltage is changed to a value between a voltage VM0 and VM1. (In the case of FIG. 8, a rush current preventing capacitor which will be described later herein is not inserted.)

However, in driving the motor after changing the driving voltage from a low voltage VM0 to a high voltage VM2 as shown in FIG. 8, the conventional device presents the following problems.

(1) With the driving voltage values (VM0 to VM2) arranged stepwise, the battery voltage drops when the motor phase adjustment is performed at a high voltage. As a result, a conversion efficiency of a voltage converter which converts the battery voltage to the motor driving voltage or that of some other voltage converter disposed within the same apparatus might be lowered. This eventually shortens the life of the battery.

(2) If the motor is caused to rotate immediately after adjustment of the stop phase thereof, a large power supply is required from the battery because of a large load. In that case, as shown in FIG. 8, the battery voltage VB is dropped by the phase adjustment and also gradually drops after the start of the motor rotation. Therefore, this brings about the same result as in the case of the problem (1) above.

SUMMARY OF THE INVENTION

This invention is directed to the solution of the above-stated problems. It is, therefore, an object of the invention to provide a motor driving voltage control device which is arranged to prevent the battery voltage from dropping to an excessive degree.

It is another object of the invention to provide a motor driving voltage control device which is capable of preventing a motor driving voltage from being lowered by a drop in the battery voltage.

These and further objects and features of the invention will become apparent from the following detailed description of embodiments thereof taken in connection with the accompanying drawings.

DETAILED DESCRIPTION OF THE PREFERRED EMBODIMENTS

Below is described in detail preferred embodiments of the invention with reference to the accompanying drawings:

First Embodiment

Figure 1:
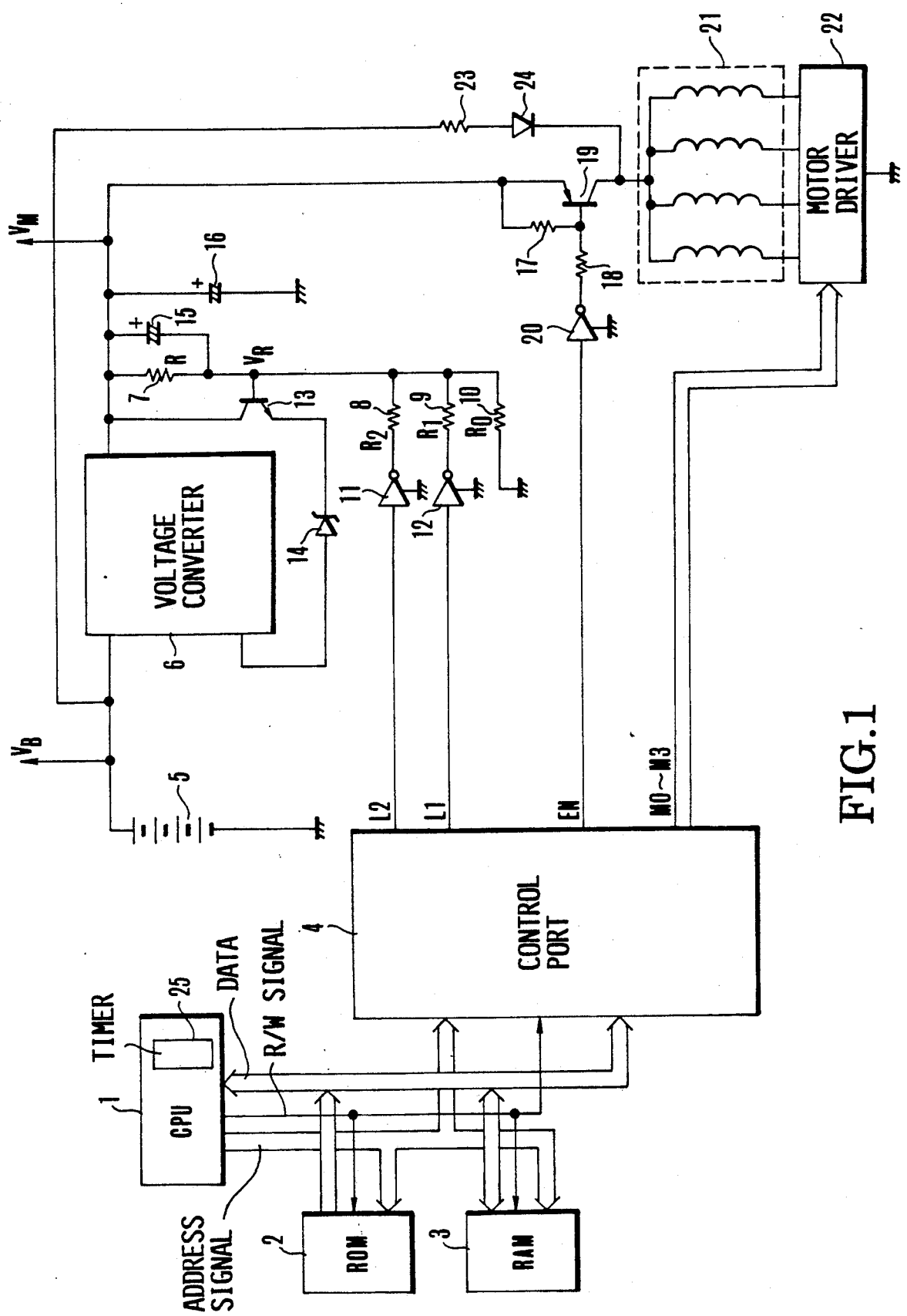
FIG. 1 is a block diagram showing the arrangement of a first embodiment of the invention.

A first embodiment of the invention is arranged as follows. FIG. 1 shows in a block diagram the arrangement of the first embodiment. Referring to FIG. 1, a CPU 1 is arranged to control the entire device. A timer 25 is arranged within the CPU 1 to control the timing of various processes to be performed within the device. A ROM 2 is arranged to store a control program, an error processing program and a program shown in a flow chart by FIG. 3 as will be described later herein. A RAM 3 serves as a work area for the various programs and a temporary shelter area for error processing. Further, the CPU 1 is arranged to send out data, an address signal and a read/write (hereinafter referred to as R/W) signal via bus lines. A control port 4 is arranged to produce signals L1 and L2 for designating a motor driving voltage, motor exciting signals M0 to M3 for driving a stepping motor 21 and a signal EN for designating strong excitation or weak excitation according to data obtained from the CPU 1. A battery 5 is employed as a power source for the device. A voltage converter 6 is arranged to convert the voltage VB of the battery 5 into a motor driving voltage VM. Voltage dividing resistors 7, 8, 9 and 10 are arranged to determine the voltage levels of the motor driving voltage VM (VM0 to VM2). A Zener diode 14 is arranged to produce reference voltages for the divided voltage values of the voltage dividing resistors 7, 8, 9 and 10. A transistor 13 is arranged to cause a Zener voltage to be reflected on the divided voltages obtained by the resistors by applying a Zener current to the Zener diode 14. Inverters 11 and 12 serve as open collectors for selecting the voltage dividing resistors 8 and 9. A capacitor 15 is arranged to gradually change the motor driving voltage by preventing a rush current which takes place when the motor driving voltage VM is changed from a low voltage to a high voltage by means of the voltage dividing resistors 7 to 10. A capacitor 16 is provided for stabilizing the motor driving voltage VM. The stepping motor 21 has four phases. A motor driver. 22 is arranged to drive each phase of the stepping motor 21. A transistor 19 is provided for selection of a driving voltage to be applied to the stepping motor 21 between a driving voltage for strong excitation and a holding voltage for weak excitation. An inverter 20 which is an open collector is provided for turning on and off the transistor 19. A resistor 18 is provided for limiting the base current of the transistor 19. A resistor 17 is provided for firmly setting the level of the transistor 19. A resistor 23 is arranged to limit a current for holding the stepping motor 21. A diode 24 is arranged to prevent any flow of a current from the motor driving voltage VM to the battery 5.

The CPU 1 is arranged to operate in accordance with each of the programs of varied kinds stored in the ROM 2. The operation of the CPU 1 can be roughly divided into the following actions. One is performed to change stepwise the motor driving voltage VM from one voltage value over to another. Another action is performed to change the stepping motor driving mode between a strong exciting mode and a weak exciting mode. The third action is performed to rotate the stepping motor 21. These three actions of the CPU 1 are described in detail below.

The stepwise changing action of the motor driving voltage VM is first described. This action is performed by the signals L1 and L2 of the control port 4. In the case of L1=L2="L" (a low level), for example, the outputs of both the inverters 11 and 12 which are open collectors are open. Therefore, the driving voltage VM is determined by a voltage value VR which is divided by the resistors 7 and 10. The voltage value VR is determined by the value of the Zener diode 14. The driving voltage VM may be expressed by the following formula (1):

$$VM = \frac{(R + R0) VR}{R0} \quad (1)$$

Then, the motor driving voltage thus obtained in this instance is assumed to be VM0.

Next, in the case of L1="H" (high level) and L2="L", the output of the inverter 12 is grounded. The driving voltage VM is then expressed as follows:

$$VM = \frac{\{R + (R0 // R1)\} VR}{(R0 // R1)} \quad (2)$$

The motor driving voltage thus obtained is assumed to be VM1.

Further, in the event of L1="L" and L2="H", the output of the other inverter 11 is grounded. Therefore, the driving voltage VM is expressed as follows:

$$VM = \frac{\{R + (R0 // R2)\} VR}{(R0 // R2)} \quad (3)$$

The value thus obtained is assumed to be VM2.

In Formula (3) above, (RA // RB) represents parallel resistance values RA and RB. In accordance with Formulas (1) to (3), the driving voltage VM can be set at a desired value by selecting the resistance values R, R0, R1 and R2 as desired. This permits selection of a relation VM0<VM1<VM2. The capacitor 15 is used for the purpose of mitigating any rush current flowing to another capacitor 16 as a result of a low input impedance obtained at the voltage converter 6 when, for example, a low driving voltage, such as the voltage VM0, changes to a higher driving voltage, such as the voltage VM1. In this case, the driving voltage VM can be gradually changed by virtue of the capacitor 15.

The second action for change-over between the strong excitation and the weak excitation is performed as follows: The second action is performed by means of the signal EN of the control port 4.

In the case of EN="H" (when the signal EN is at a high level), the output of the inverter 20 which is an open collector is grounded. Therefore, a oase current flows via the resistor 18 to the transistor 19 to turn on the transistor 19. As a result, the driving voltage VM is supplied to the common terminal of the stepping motor 21. In this case, if any of the motor phase terminals of the motor driver 22 is turned on by the motor exciting signals M0 to M3 from the control port 4, (the number of phases to be turned on varies with the driving method), a current flows to the stepping motor 21. This brings the motor into a strongly excited state.

In the event of EN="L" (when the signal EN is at a low level), the output terminal of the inverter 20 is opened to turn off the transistor 19. In that case, a voltage is supplied from the battery 5 to the common terminal of the stepping motor 21 via the resistor 23 and the diode 24. If any of the phase terminals of the motor driver 22 have been turned on by the signals M0 to M3 under this condition, there flows a current which does not give any sufficient torque for rotating the stepping motor 21 but gives a torque large enough for holding the rotor of the stepping motor 21. In that instance, there obtains a weak exciting state. Further, in the case of the first embodiment, the value of the current obtained when the battery 5 is in the initial service stage differs from the current value obtainable in the last service stage of the battery 5. In view of this, this embodiment is preferably applied to an apparatus which allows a certain amount of margin to the range of the holding torque values.

The third action of rotating the stepping motor 21 is performed in the following manner. In the case of this action, the embodiment is set in a strong exciting mode, that is, EN="H". The motor exciting signals M0, M1, M2 and M3 are serially changed from one over to another by turns. By this, the stepping motor 21 is rotated by repeatedly turning on and off each phase part of the motor driver 22. The timing for this action is determined by the timer 25 which is disposed within the CPU 1.

The first embodiment which is arranged as described above operates in the following manner.

Figure 2:
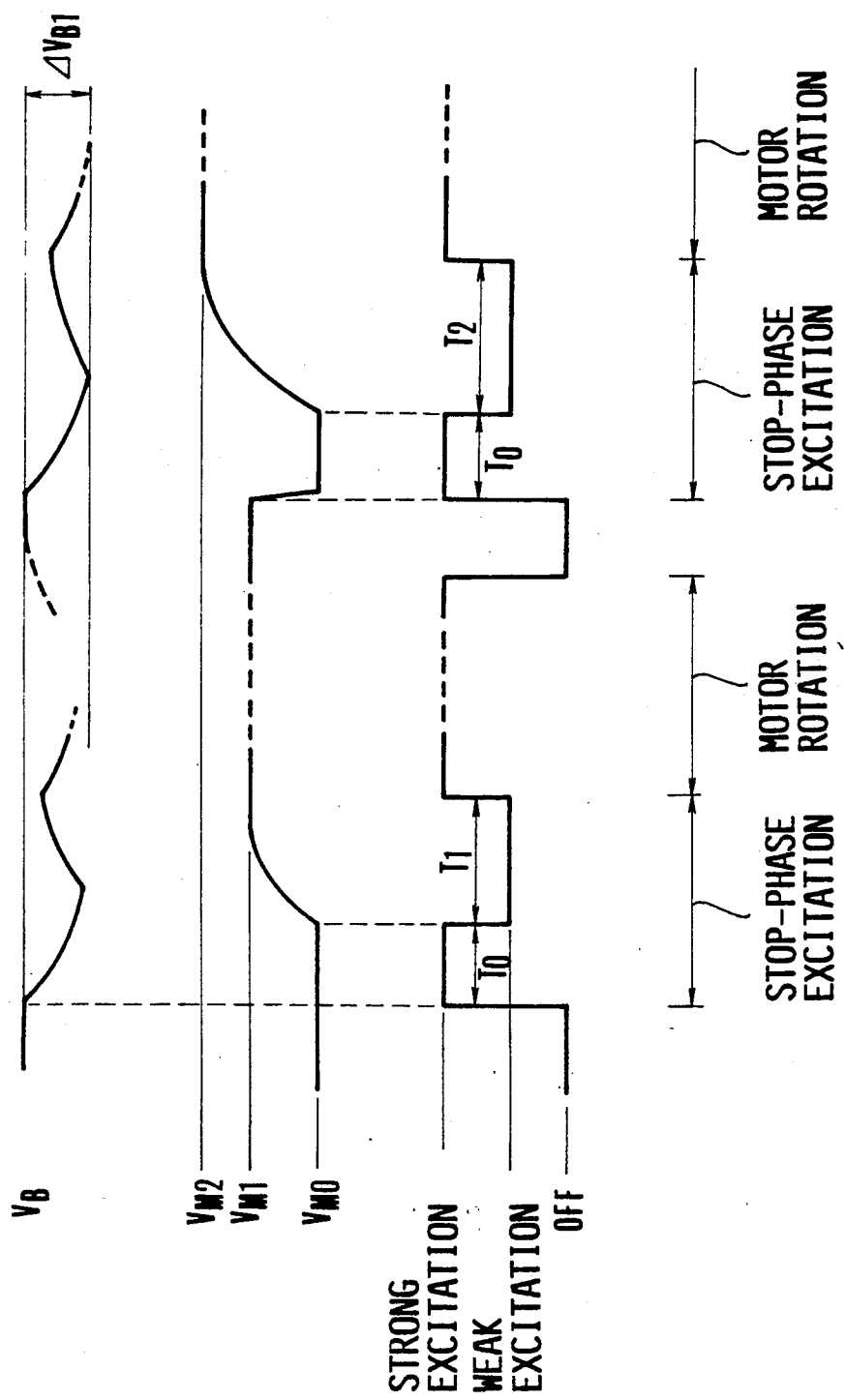
FIG. 2 shows a relation obtained between voltage values and excitation by the first embodiment.
Figure 3:
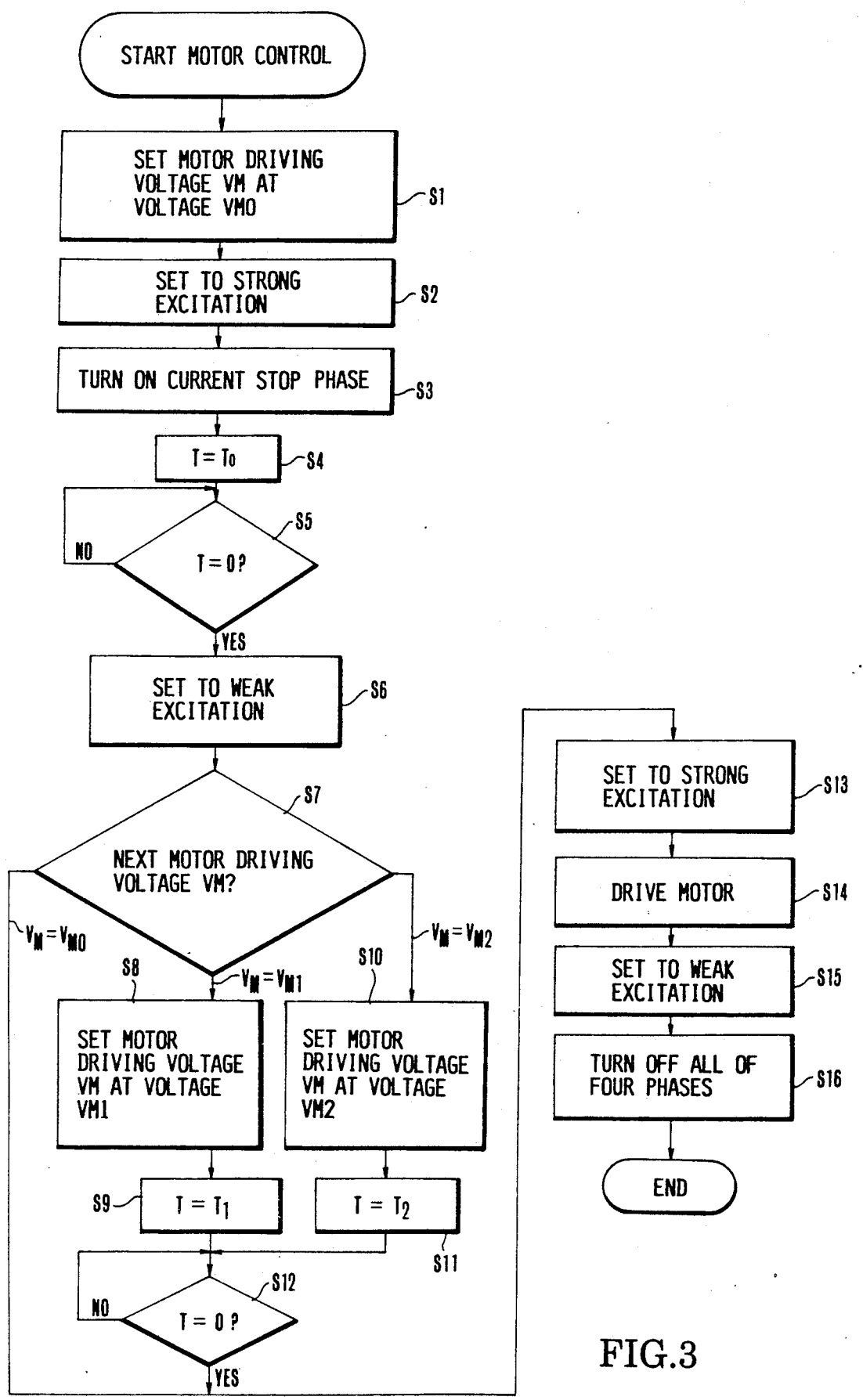
FIG. 3 is a flow chart showing the motor control operation of the first embodiment.

FIG. 2 shows a relation obtained between the voltage and the exciting action of the first embodiment. FIG. 3 shows in a flow chart the motor control operation of the first embodiment. A phase adjusting action for adjusting the actual stop phase of the stepping motor 21 to the current stop phase of the stepping motor 21 stored in the RAM 3 is performed by strongly exciting the stop phase of the motor 21 for a given period of time T0. This period of time T0 is a strong excitation time necessary for stop-phase excitation. In this instance, the motor driving voltage VM is set at the lowest voltage value VM0 for the purpose of minimizing the consumption of the battery 5. For this purpose, both the signals L1 and L2 are set at a low level "L", at a step S1 in the flow of the motor control operation. At a step S2 the signal EN is set at a high level "H" to turn on the transistor 19 in order to start the strong exciting operation. At a step S3 the stepping motor exciting signals M0 to M3 are produced in such a way as to turn on the current stop phase stored at the RAM 3. At a step S4 to set the strong stop-phase exciting time T0, the timer value T of the timer 25 is set at a value T0 for time measurement. At a step S5: an ensuing action is held in abeyance until the timer 25 counts the time T from the value T0 down to zero. This allows the strong stop-phase excitation to be carried out over the length of time T0. While the stop phase of the motor is thus strongly excited, the battery voltage VB gradually drops as shown in FIG. 2. Following this, the driving voltage of the stepping motor 21 is changed according to the action of the apparatus. In that instance, if the driving voltage necessary for the next action is the voltage VM1 or VM2, the driving voltage changes from the voltage VM0 to the voltage VM1 or VM2. In this case, the capacitor 15 acts to cause the voltage to gradually rise as mentioned in the foregoing and, therefore, some period of time is required for the change.

As shown in FIG. 2, the greater potential difference from the motor driving voltage VM0 to the voltage VM2 requires a longer period of time. If a strong exciting action is carried out during this changing period of time, the voltage VB would drop as the current flowing to the stepping motor 21 increases, and thus the life of the battery would eventually be affected by this. To avoid the adverse effect of this on the battery, the first embodiment is arranged to perform a weak exciting action during the above-stated changing period.

At a step S6, for the above-stated purpose of weakly exciting the stop phase, the signal EN is set at a low level to turn off the transistor 19. Then, a weak exciting current is supplied from the battery 5 through the resistor 23 and the diode 24. At a step S7 a check is made for a driving voltage VM required for a next action. If the driving voltage required is found to be the voltage VM0, the flow of operation comes to a step S13. If the voltage required is VM1, the flow proceeds to a step S8. At a step S8 the signal L1 is set at a high level and the signal L2 at a low level to cause the motor driving voltage VM to be set at the voltage value VM1. At a step S9, after the step S8, a period of time T1 for a change from the voltage value VM0 to the voltage value VM1 is set at the timer 25. At a step S12 the flow of the operation waits till the value T of the timer 25 is counted down from a value T1 to zero.

If the driving voltage required for the next action is found to be the voltage value VM2 at the step S7, the flow comes to a step S10. At the step S10 the motor driving voltage VM is set at the voltage value VM2. At a step S11 a period of time T2 required for the change from the voltage value VM0 to the voltage value VM2 is set at the timer 25. The flow then comes to the step S12 to wait till the timer 25 counts down from the time T2 to zero. The time values T1 and T2 are set to allow ample margins over and above an actual build-up time for a possible error in the capacity of the capacitor 15. With the stop phase weakly excited in this manner, the voltage VB at first somewhat drops because of the change in the motor driving voltage VM. After that, a load obtained during the period of time T0 decreases. Therefore, the voltage VB is brought back to its original value by setting the resistor 23 at a desired value as shown in FIG. 2.

At steps S13 and S14 the motor driving voltage VM is considered to have reached the set voltage value and the stepping motor 21 begins to actually rotate. More specifically, the signal EN which has been set on the side of weak excitation is again set at a high level for strong excitation at the step S13. After that, at the step S14, the stepping motor 21 is caused to actually rotate from a step next to the stop phase thereof to the extent of a necessary number of steps of the motor by the motor exciting signals M0 to M3.

At a step S15: The signal EN is set at a low level for weak excitation for the purpose of bringing all the four phases of the stepping motor 21 to a stop. At a step S16: The motor exciting signals M0 to M3 are turned off. With the stepping motor 21 rotated in this manner, the battery voltage VB drops as shown in FIG. 2. After that, the level of the voltage VB varies up and down according to the mode of driving the stepping motor 21. The voltage VB again comes back to the original level thereof when the motor 21 is turned off.

Figure 8:
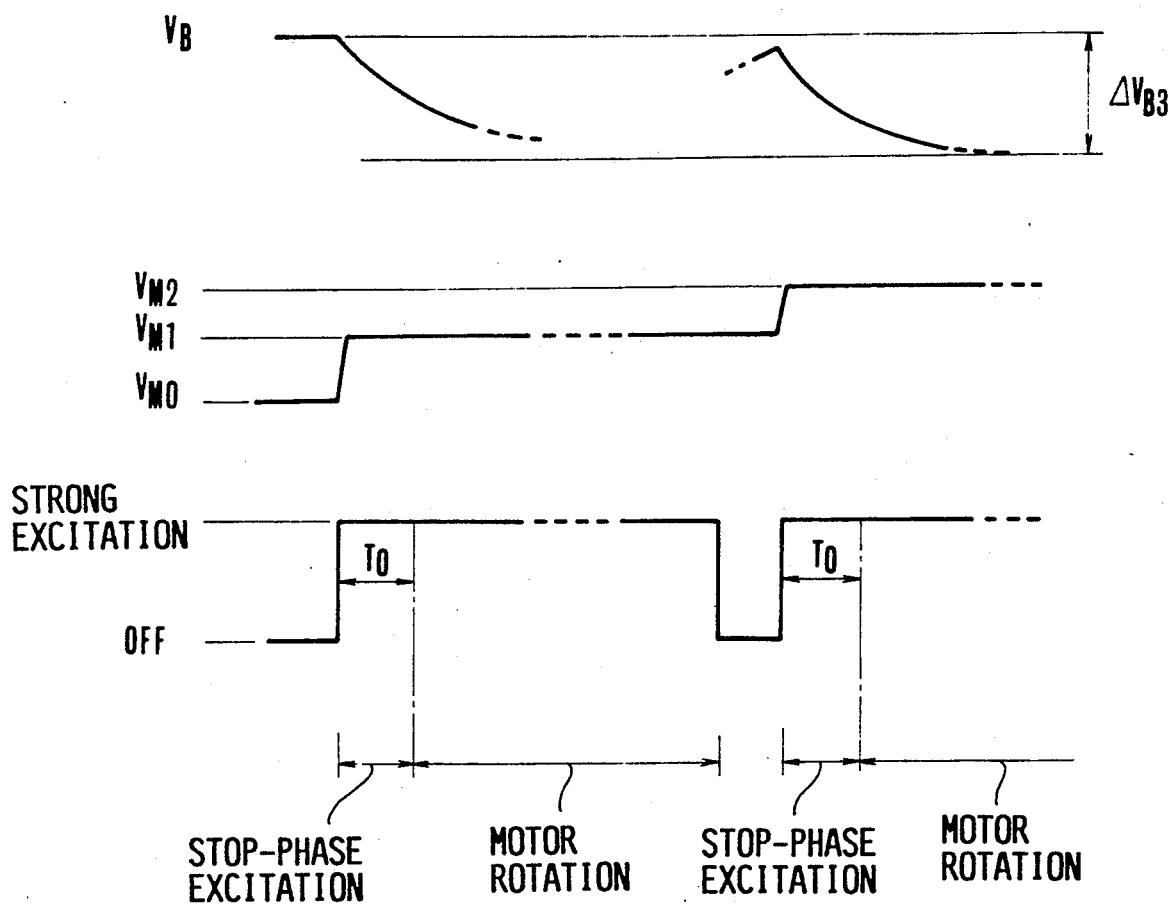
FIG. 8 shows a voltage-to-excitation relation obtained by a conventional device.

In changing the motor driving voltage VM from the voltage value VM1 to the voltage value VM2, the motor driving voltage VM is at first lowered to the lowest voltage value VM0 for the strong stop-phase excitation. The strong stop-phase exciting action is performed under this condition. Therefore, in this instance, the battery voltage VB drops in the same manner as during the period of time T provided for changing the motor driving voltage VM from the voltage value VM0 to the voltage value VM1. Further, the potential difference is larger for changing the motor driving voltage VM from the voltage value VM0 to the voltage value VM2 than for changing it from the voltage value VM0 to the voltage value VM1. Therefore, the battery voltage VB drops to a little greater degree within the period of time T2 than within the period of time T1. After this change, the battery voltage VB changes for the weak excitation as shown in FIG. 2. The changing degree of the battery voltage VB fluctuates according to the size of the load on the stepping motor 21, the size of the input impedance of the voltage converter 6, the efficiency of the voltage converter 6, etc. The width $\Delta VB1$ of the changes in the battery voltage VB is less than the width $\Delta VB3$ of the battery voltage changes as shown in FIG. 8. This indicates that the change width of the battery voltage VB is effectively suppressed by the arrangement of the first embodiment.

As described above, the first embodiment is arranged to prevent the battery voltage from excessively dropping and is thus capable of preventing the stepping motor driving voltage, etc. from being lowered by the drop of the battery voltage. Therefore, the life of the battery can be lengthened.

Second Embodiment

Figure 4:
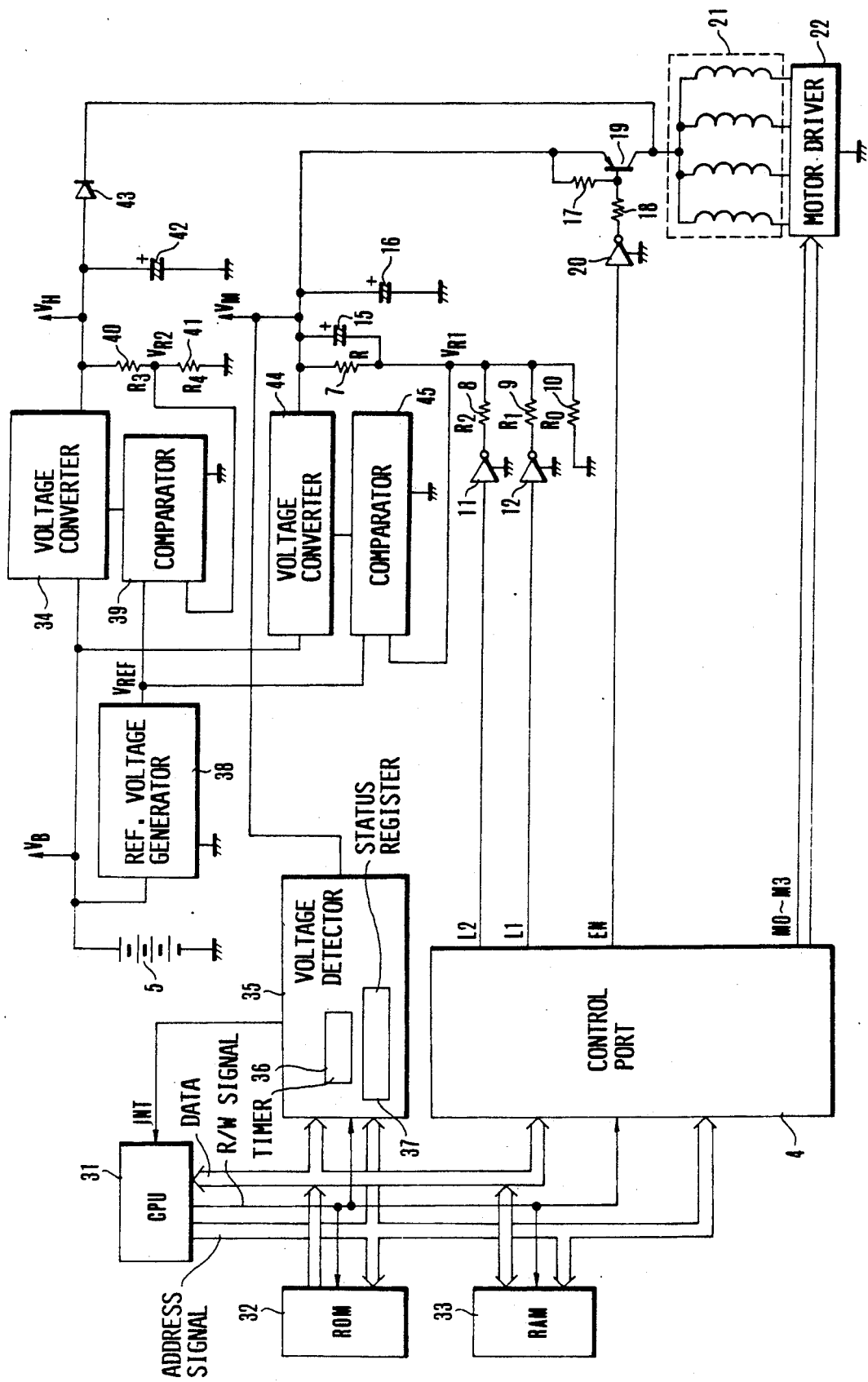
FIG. 4 is a block diagram showing the arrangement of a second embodiment of the invention.

Next, a second embodiment of the invention is described as follows. FIG. 4 shows in a block diagram the arrangement of the second embodiment. In FIG. 4, the parts of the second embodiment which are indicated by the same reference numerals as in FIG. 1 are arranged to act in the same manner as in the case of the first embodiment. Therefore, the details of them are omitted from the following description. A reference voltage generator 38 is arranged to generate a voltage which is to be used as a reference for voltage conversion. Comparators 39 and 45 are arranged to compare voltages obtained by dividing a voltage by means of resistors with the reference voltage VREF generated by the reference voltage generator 24 for determining voltages VH and VM and to turn on and off voltage converters 34 and 44 according to the results of comparison. Voltage dividing resistors 40 and 41 are provided for determining the voltage VH which is to be used for holding (weakly exciting) the stepping motor 21. A capacitor 42 is arranged to stabilize the holding voltage VH. A diode 43 is provided for cutting off a current flow from the motor driving voltage VM to the holding voltage VH. The motor driving voltage VM is higher than the motor holding voltage VH in the same manner as in the case of the first embodiment.

A CPU 31 is arranged to control the whole device of the second embodiment. A ROM 32 is arranged to store therein a control program, an error processing program and a program which is arranged according to a flow chart shown in FIG. 6. A RAM 33 is arranged to serve as work areas for various programs and a temporary shelter area in the case of error processing. A voltage detector 35 includes a timer 36 which is arranged to function in the same manner as the timer 25 of the first embodiment and a status register 37 which is provided for setting interruption information as will be described later herein.

In performing the roughly divided three actions stated in the foregoing description of the first embodiment, the second embodiment operates as follows.

The first action of changing stepwise the motor driving voltage VM is performed by means of the signals L1 and L2 of the control port 4 in the same manner as in the case of the first embodiment. However, the voltage values VM0, VM1 and VM2 of the motor driving voltage VM are expressed according to the levels of the signals L1 and L2 in the following manner: In the case of L1=L2="L", the driving voltage value VM0 is obtained as expressed below:

$$VM0 = \frac{(R + R0) VR1}{R0} \quad (4)$$
$$= \frac{(R + R0) VREF}{R0}$$

In the case of L1="H" and L2="L", the driving voltage value VM1 is obtained as expressed below:

$$VM1 = \frac{\{R + (R0 // R1)\} VR1}{(R0 // R1)} \quad (5)$$
$$= \frac{\{R + (R0 // R1)\} VREF}{(R0 // R1)}$$

In the case of L1="L" and L2="H", the driving voltage value VM2 is obtained as expressed below:

$$VM2 = \frac{\{R + (R0 // R2)\} VR1}{(R0 // R2)} \quad (6)$$
$$= \frac{\{R + (R0 // R2)\} VREF}{(R0 // R2)}$$

The motor driving voltage values can be obtained in a relation of VM0<VM1<VM2 according to the above formulas (4), (5) and (6) by suitably selecting resistance values R, R0, R1 and R2.

Meanwhile, the holding voltage VH is expressed as follows:

$$VH = \frac{(R3 + R4) VR2}{R4} \quad (7)$$
$$= \frac{(R3 + R4) VREF}{R4}$$

The voltage values can be obtained in a relation of VH<VM0<VM1<VM2 according to the formulas (4) to (7) by suitably selecting resistance values R3 and R4.

Figure 5:
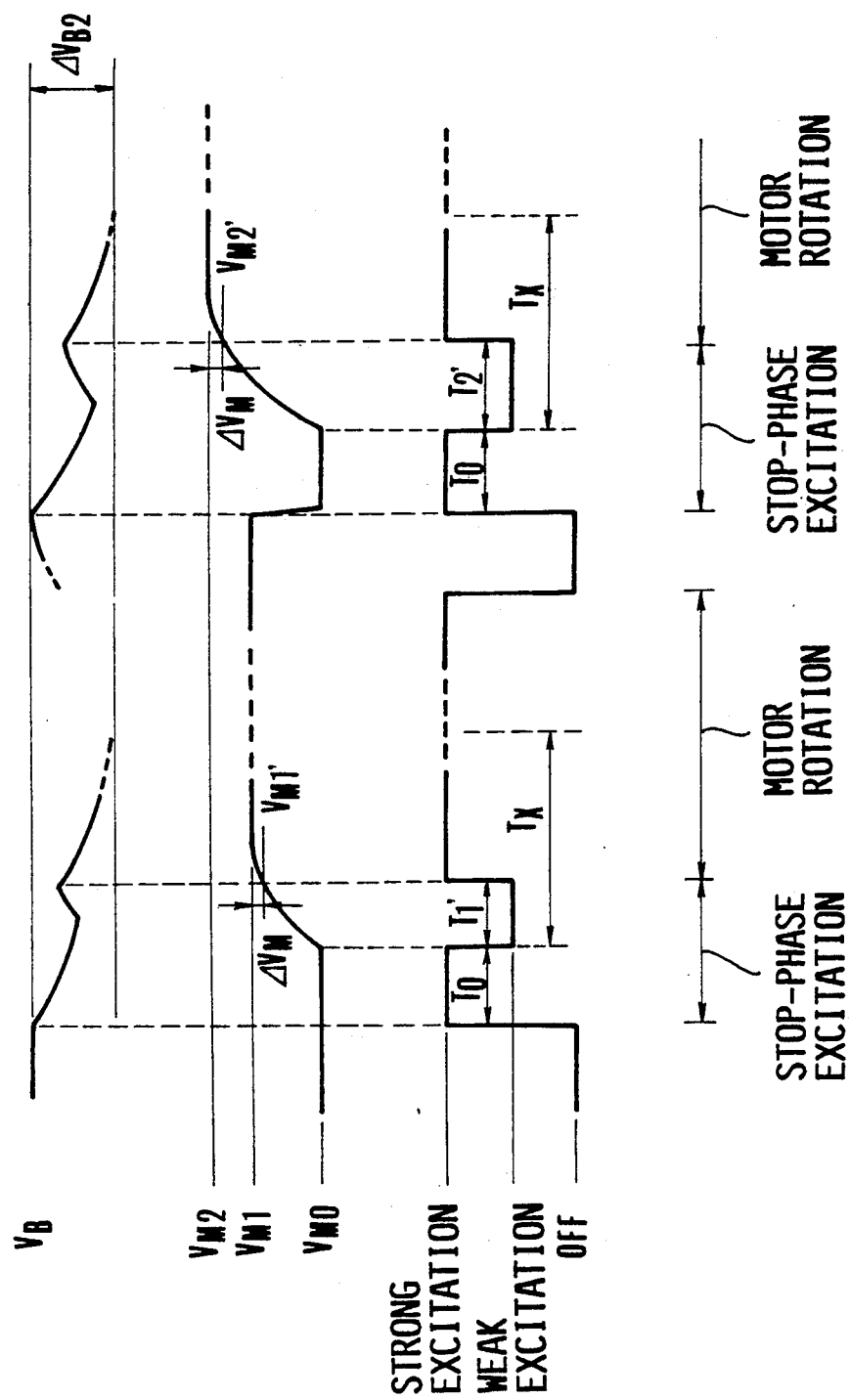
FIG. 5 shows a relation obtained between voltages and excitation by the second embodiment.

The second action of changing the motor driving mode between strong and weak exciting actions is performed by means of the transistor 19. In the case of the second embodiment, the strong exciting action is performed by driving the motor with the motor driving voltage VM while the weak exciting action is performed by driving the motor with the holding voltage VH. The first embodiment is arranged to perform the weak exciting action by directly driving the motor with the power supply effected from the battery 5 via the resistor and the diode. This has caused a holding current to fluctuate according to the level of the life of the battery. Although this arrangement of the first embodiment presents no problem depending on the kind of the apparatus to which the invention is applied, the second embodiment is arranged with importance attached to the holding current. In other words, in the case of the second embodiment, the stepping motor 21 is held by the holding voltage VH which is stabilized by means of the voltage converter 34. Further, the arrangement of the second embodiment differs from that of the first embodiment with respect of the provision of the voltage detector 35. The voltage detector 35 is arranged to permit an interrupt signal INT to be applied to the CPU 31 when the data for a voltage value written and obtained from the CPU 31 comes to coincide with the motor driving voltage VM. The signal INT is used for the purpose of confirming that the motor driving signal VM has reached a given value during its changing process. This arrangement prevents the voltage varying time from being wasted due to an error in the capacity of the capacitor 15 as mentioned in the foregoing description of the first embodiment. At this voltage detector 35, detection voltage values VM1' and VM2' are set as shown in FIG. 5. These voltage setting values must be arranged to differ from the actual motor driving voltage values VM1 and VM2 only as much as ΔVM which permits the stepping motor 21 to be adequately driven. Further, at the voltage detector 35, a setting time T is measured by the timer 36. Upon the lapse of a time T0 or a detection time Tx, for example, the signal INT is supplied to the CPU 31. The signal INT is supplied to the CPU 31 also when the detection voltage value VM1' or VM2' is detected while the motor is rotating. Upon detection of the signal INT while the motor is rotating, the CPU 31 reads and takes in the contents of the status register 37 disposed within the voltage detector 35. This enables the CPU 31 to make a discrimination between an interruption resulting from detection of the voltage value and an interruption resulting from the lapse of the detection time Tx as measured by the timer 36.

Figure 6:
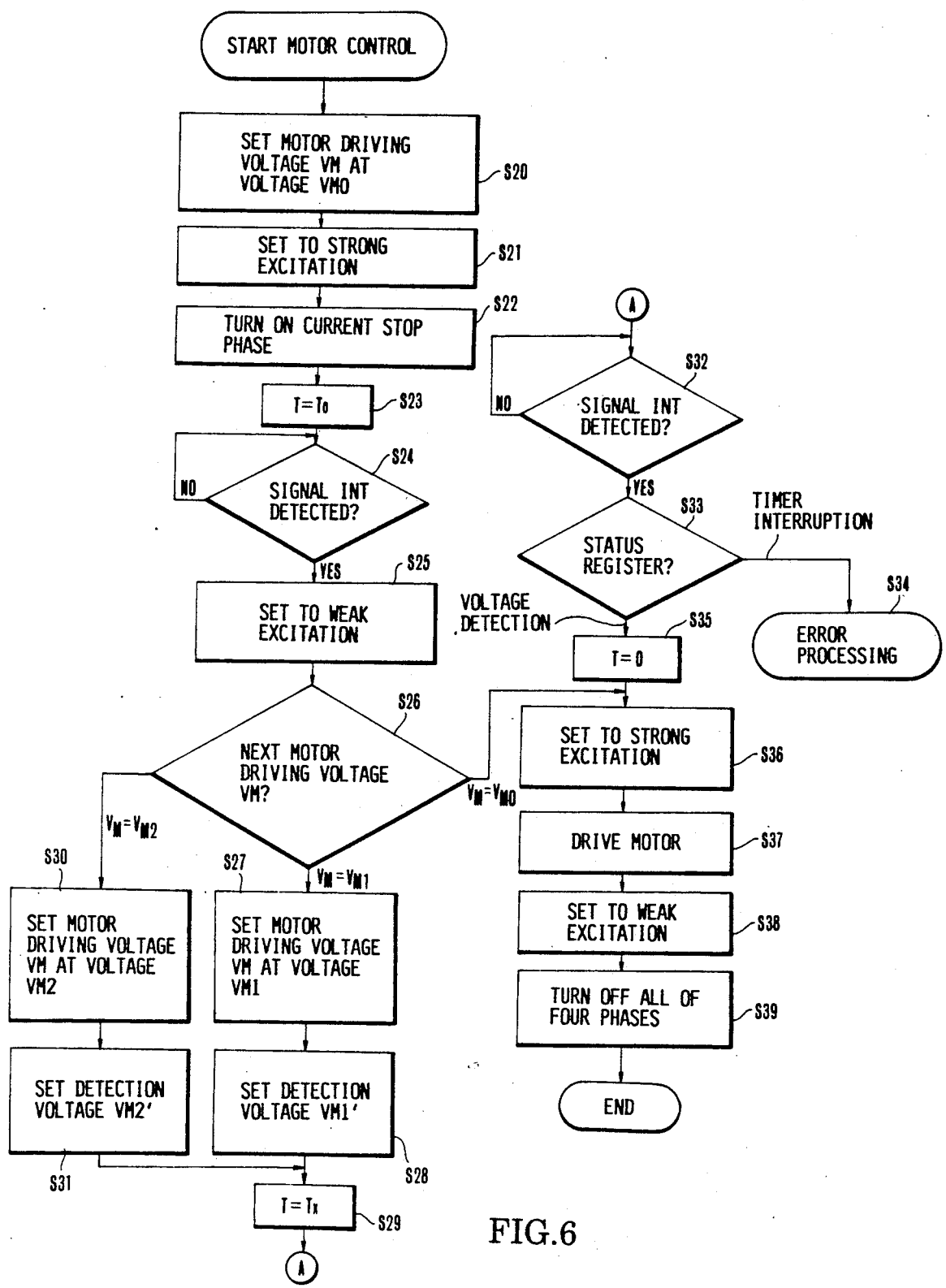
FIG. 6 is a flow chart showing the motor control operation of the second embodiment.

The operation of the second embodiment is further described as follows. FIG. 5 shows a relation obtained between the voltage and excitation according to the arrangement of the second embodiment. FIG. 6 shows in a flow chart the motor control operation of the second embodiment. The second embodiment as a whole performs the motor control operation approximately in the same manner as the first embodiment. A difference between them lies in that either the operation is furthered or an error processing action is performed according to the signal INT detected by the voltage detector 35. Referring to the flow chart, the motor control operation is described as follows:

At steps S20 to S22 the motor is driven at the current stop phase in the strong excitation mode in the same manner as in the case of the first embodiment. After that, the flow comes to a step S23. At the step S23 the timer 36 of the voltage detector 35 is set at a strong exciting time T0 for the stop-phase exiting action. At a step S24 the CPU 31 makes a check for the signal INT received from the voltage detector 35. If the signal INT is found to have been received, the flow of operation comes to a step S25. At the step S25 it is assumed that the period of time T0 necessary for the strong exciting action has elapsed and the stop-phase exciting action is shifted to the weak exciting mode. At a step S26 a check is made for the next value of the motor driving voltage VM. If the next voltage value of the motor driving voltage VM is found to be the voltage value VM0, the flow of operation comes to a step S36. At the step S36 the stop-phase exciting mode for the stepping motor 21 is changed to the strong exciting mode for rotating the motor in the same manner as in the case of the first embodiment. In steps S37 and S38 when the stepping motor 21 which is at the stop phase is rotated to an extent of a given number of steps from the stop phase, the motor driving action is changed over to the weak exciting mode. At a step S39 all the four phases of the stepping motor 21 are turned off.

If the next voltage value of the motor driving voltage VM is found to be the voltage value VM1 or VM2 at the step S26, the flow of operation comes to a step S27 or S30. At the step S27 or S30 the motor driving voltage VM is set at the voltage value VM1 or VM2. At a step S28 or S31 at the voltage detector 35, the detection voltage VM1' or VM2' is set accordingly. At a step S29 the timer 36 is set at the detection time Tx for the purpose of detecting whether or not the above-stated detection voltage value VM1' or VM2' is detected by the voltage detector 35 within a given period of time. Then, the flow comes to a step S32. At the step S32 the flow waits for the generation of the interrupt signal INT.

Upon receipt of the signal INT, the flow comes to a step S33. At the step S33: The CPU 31 reads and takes in the contents of the status register 37 of the voltage detector 35. The contents of the register 37 is checked for the reason why the interruption (by the signal INT) is made. If the reason for the interruption is found to be the detection of voltage VM1' or VM2', the flow comes to a step S35. At the step S35 the value of the timer 36 is cleared to zero to prevent the occurrence of any timer interruption during the ensuing process of the operation. The ensuing steps S36 to S39 are executed as described above. Further, if the interruption is found at the step S33 to be the timer interruption which has resulted from the lapse of the detection time Tx before the motor driving voltage VM reaches the detection voltage VM1' or VM2', the flow comes to a step S34 to perform an error processing action and the flow of operation comes to an end.

Next, the relation which obtains among voltage values when the motor driving voltage VM varies from the voltage value VM0 to the voltage value VM1 and from VM1 to VM2 is described in detail below along with a difference of the second embodiment from the first embodiment.

The difference from the first embodiment lies in the period of time for weakly exciting the current stop phase of the motor. In a case where the motor driving voltage VM changes from the voltage value VM0 to the voltage value VM1, the weak exciting period is determined by the time T1' required before the motor driving voltage VM reaches the detection voltage VM1' set at the voltage detector 35 as shown in FIG. 5. The time T1' is shorter than the time T1 of the first embodiment. Therefore, in the case of the second embodiment, the period of time required before the stepping motor 21 begins to rotate is shorter than the first embodiment. In this instance, however, the detection voltage VM1' must be set at a value which is sufficiently large for driving the stepping motor 21 to rotate. If the detection time T1' comes to exceed the detection time Tx, the flow of operation proceeds to the step S37 for error processing according to the result of check made at the step S35. Further, in this instance, the voltage VB of the battery 5 is considered to be somewhat lower than in the case of the first embodiment at the start of motor driving after a drop in the battery voltage VB because of a shorter time allowed for voltage recovery during the time T1'.

When the motor driving voltage VM changes from the voltage value VM1 to the voltage value VM2, the motor driving voltage VM is at first changed to the lowest motor driving voltage value VM0, and the stop phase is adjusted by a strong exciting action in the same manner as in the case of the first embodiment. After that, the stop phase is weakly excited until the motor driving voltage VM reaches the detection voltage VM2' set at the voltage detector 35. In a case where the motor driving voltage VM changes from the voltage value VM1 to the voltage value VM2, the period of time of the weak exciting action is determined by a period of time T2' required before the motor driving voltage VM reaches the detection voltage VM2' set at the voltage detector 35. This period of time T2' is shorter than the corresponding period of time T2 of the first embodiment. In the case of the second embodiment, the period of time required before the stepping motor 21 comes to rotate is thus shortened. However, since the period of time allowed for the recovery of the battery voltage VB becomes shorter, the battery voltage VB drops to a little greater degree in the case of the second embodiment than in the case of the first embodiment.

As described above, the second embodiment is not only capable of giving about the same advantageous effect as the first embodiment but also is capable of shortening the whole operation time by virtue of the arrangement that permits the motor driving voltage changing time to be set at an optimum value as desired.

Third Embodiment

The following describes a third embodiment of the invention. The arrangement of the third embodiment is similar to that of the first embodiment described in the foregoing and is, therefore, omitted from description. The following description is thus limited to the functions of the third embodiment.

Figure 7:
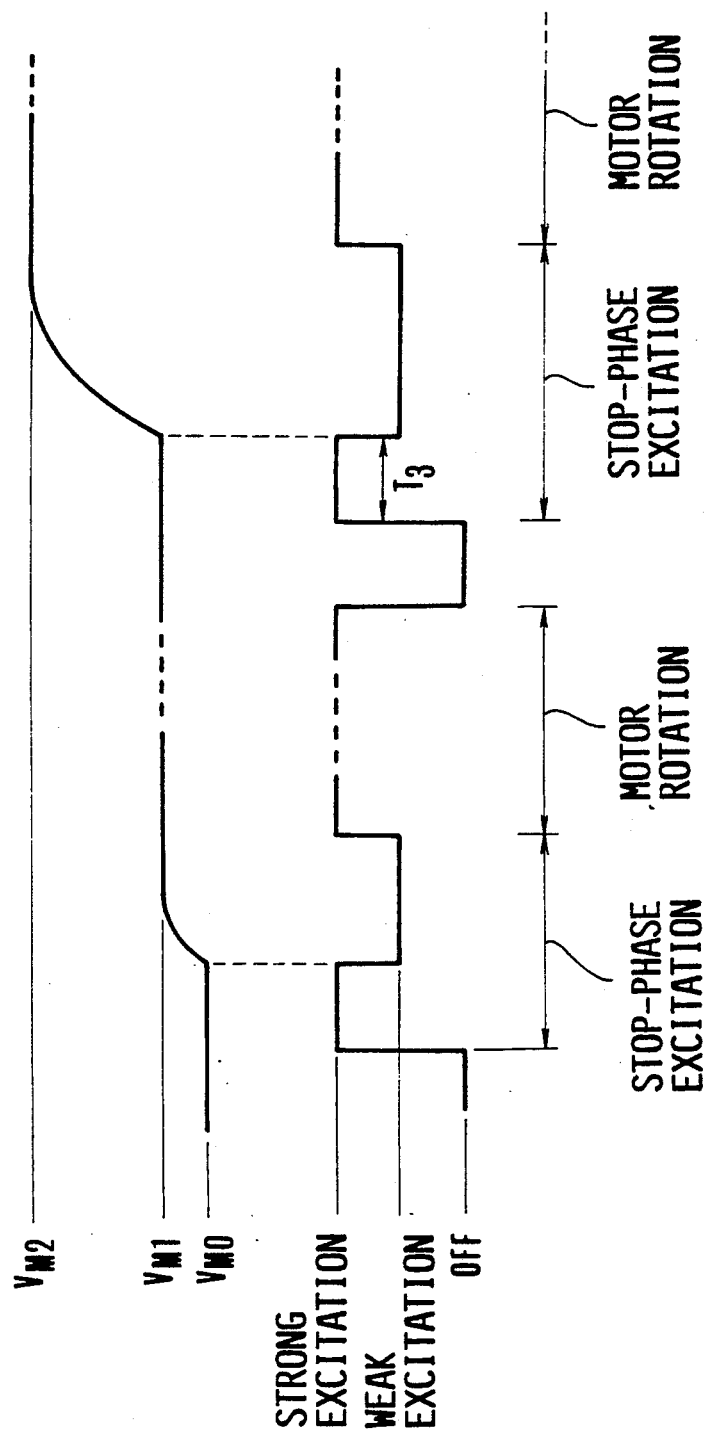
FIG. 7 shows a voltage-to-excitation relation obtained by a third embodiment of the invention.

In each of the first and second embodiments described in the foregoing, the stop phase of the motor is adjusted by shifting the motor driving voltage VM to its lowest value VM0. However, this invention is not limited to this arrangement. In cases where the motor driving voltage VM is stepwise divided into several values, the strong stop-phase exciting action does not have to be always performed at the lowest level of the motor driving voltage VM. The stop-phase exciting action may be arranged to be performed at a motor driving voltage value which is only one step lower than a voltage value at which the motor is to be driven next time. FIG. 7 shows a relation obtained by the third embodiment between the motor driving voltage value and the exciting action.

Referring to FIG. 7, the motor driving voltage VM does not have to be changed from the voltage value VM1 to the voltage value VM2 during a period of time T3 which is provided for strongly exciting the stop phase of the motor, because: The motor driving voltage value VM0 differs to a much less degree from the motor driving voltage VM1 than in the case of the time T0 shown in FIG. 2. The third embodiment is, therefore, arranged to strongly excite the stop phase at the motor driving voltage value VM1.

With the third embodiment arranged as mentioned above, although the battery voltage drops once for phase adjustment, a load of waiting time is lessened to enable the battery voltage to recover. This allows the stepping motor to begin to rotate after the recovery of the battery voltage. The battery voltage, therefore, can be prevented from continuously dropping.

In accordance with this invention, as described in the foregoing, the battery voltage can be prevented from dropping to an excessive degree. The motor driving voltage also can be prevented from being lowered by the drop of battery voltage. The invented arrangement, therefore, ensures a longer life of the battery in use.

What is claimed is:

1. A motor driving voltage control system comprising:
   a stepping motor having a plurality of phases;
   voltage generating means for applying voltages to said plurality of phases of said stepping motor, said voltage generating means being arranged to generate a driving voltage for driving said stepping motor and a holding voltage for holding said stepping motor, said driving voltage being set at one of a plurality of voltage values;
   first switching means for applying one of said driving voltage and said holding voltage generated by said voltage generating means to said plurality of phases of said stepping motor;
   second switching means for selecting one of said plurality of voltage values of said driving voltage generated by said voltage generating means; and
   control means for generating an exciting signal for serially changing over an excited state of said plurality of phases of said stepping motor, said control means being arranged to bring, in an initial stage of control, a stop phase of said stepping motor into an excited state, to cause said first switching means to select said driving voltage and said second switching means to select the lowest of said plurality of voltage values of said driving voltage, and, in the next stage of control, to cause said first switching means to select said holding voltage and, after that, select said driving voltage again.

2. A system according to claim 1, wherein said control means includes a timer arranged to determine the length of time of said initial stage of control and that of said next stage.

3. A system according to claim 2, wherein the length of time of said initial stage determined by said timer is set at a length of time required for adjustment of the phase of said stepping motor, and that of said next stage is set at a length of time required for changing said driving voltage from the lowest voltage value up to a desired voltage value in driving said stepping motor.

4. A motor driving voltage control system comprising:
   a stepping motor having a plurality of phases;
   voltage generating means for applying voltages to said plurality of phases of said stepping motor, said voltage generating means being arranged to generate a driving voltage for driving said stepping motor and a holding voltage for holding said stepping motor, said driving voltage being set at one of a plurality of voltage values;
   first switching means for applying one of said driving voltage and said holding voltage generated by said voltage generating means to said plurality of phases of said stepping motor;
   second switching means for selecting one of said plurality of voltage values of said driving voltage generated by said voltage generating means;
   control signal generating means for generating an exciting signal for serially changing over an excited state of said plurality of phases of said stepping motor, said control signal generating means being arranged to generate a first signal and a second signal for performing selecting operations of said first and second switching means; and
   control means for controlling generation of said first and second signals by said control signal generating means, said control means being arranged to cause, in an initial stage of control, said control signal generating means to generate the exciting signal for bringing a stop phase of said stepping motor into an excited state, to generate the first signal for having said driving voltage applied to said stepping motor by said first switching means and to generate the second signal for having the lowest of said plurality of voltage values of said driving voltage set by said second switching means, said control means being further arranged to cause, in the next stage of control, said control signal generating means to continue generating the exciting signal generated in said initial stage of control and to generate the first signal for having said holding voltage applied to said stepping motor by said first switching means, and, after that, to generate the exciting signal for serially changing over the excited state of said plurality of phases of said stepping motor to drive said stepping motor, to generate the first signal for having said driving voltage applied to said stepping motor by said first switching means, and to generate the second signal for having said driving voltage set by said second switching means at a desired one of said plurality of voltage values.

5. A motor driving voltage control system comprising:

a stepping motor having a plurality of phases;

voltage generating means for applying voltages to said plurality of phases of said stepping motor, said voltage generating means being arranged to generate a driving voltage for driving said stepping motor and a holding voltage for holding said stepping motor, said driving voltages being set at one of a plurality of voltage values;

rotation driving means for driving said stepping motor by serially changing over an exciting phase of said stepping motor, said rotation driving means being arranged to apply a driving voltage to the exciting phase;

phase adjusting means for adjusting the exciting phase of said stepping motor to a stop phase of said stepping motor when changing said stepping motor from a stopped state into a driven state, said phase adjusting means being arranged to apply to the exciting phase of said stepping motor the driving voltage having a low value among said plurality of voltage values; and setting means for setting a waiting period of time between the end of a phase adjusting action of said phase adjusting means and the commencement of a driving action of said rotation driving means, said setting means being arranged to apply said holding voltage to the exciting phase of said stepping motor.

6. A system according to claim 5, further comprising detecting means for detecting arrival of said driving voltage generated by said voltage generating means at a predetermined voltage value during the process of changing said driving voltage from the low voltage value to a high voltage value, said rotation driving means being arranged to drive said stepping motor to rotate when said driving voltage is detected to have reached said predetermined voltage value by said detecting means.

7. A system according to claim 6, wherein said detecting means includes setting means for setting, on the basis of changes taking place in said driving voltage, a waiting time before detection.

* * * * *

UNITED STATES PATENT AND TRADEMARK OFFICE
CERTIFICATE OF CORRECTION

PATENT NO. : 5,034,674
DATED : July 23, 1991
INVENTOR(S) : Shoji Sasto

It is certified that error appears in the above-identified patent and that said Letters Patent is hereby corrected as shown below:

At [57] ABSTRACT:

Line 4, "thr" should read --the--.

COLUMN 3

Line 17, "driver." should read --driver--.

COLUMN 5

Line 25, "step S5:" should read --step S5--.

COLUMN 6

Line 27, "step S15: The" should read --step S15 the--.
Line 29, "step S16:" should read --step S16--.
Line 30, "The" should read --the--.

UNITED STATES PATENT AND TRADEMARK OFFICE
CERTIFICATE OF CORRECTION

PATENT NO. : 5,034,674
DATED : July 23, 1991
INVENTOR(S) : Shoji Sasto

It is certified that error appears in the above-identified patent and that said Letters Patent is hereby corrected as shown below:

Column 9, line 63, "step S33: The" should read --step S33 the--

Signed and Sealed this

Ninth Day of February, 1993

Attest:

STEPHEN G. KUNIN

*Attesting Officer*   Acting Commissioner of Patents and Trademarks